Sept. 25, 1962 S. P. LUNDSKOG 3,055,697
LIFT HOOK WITH SELF-OPERATING SAFETY LATCH
Filed July 1, 1960 3 Sheets-Sheet 1
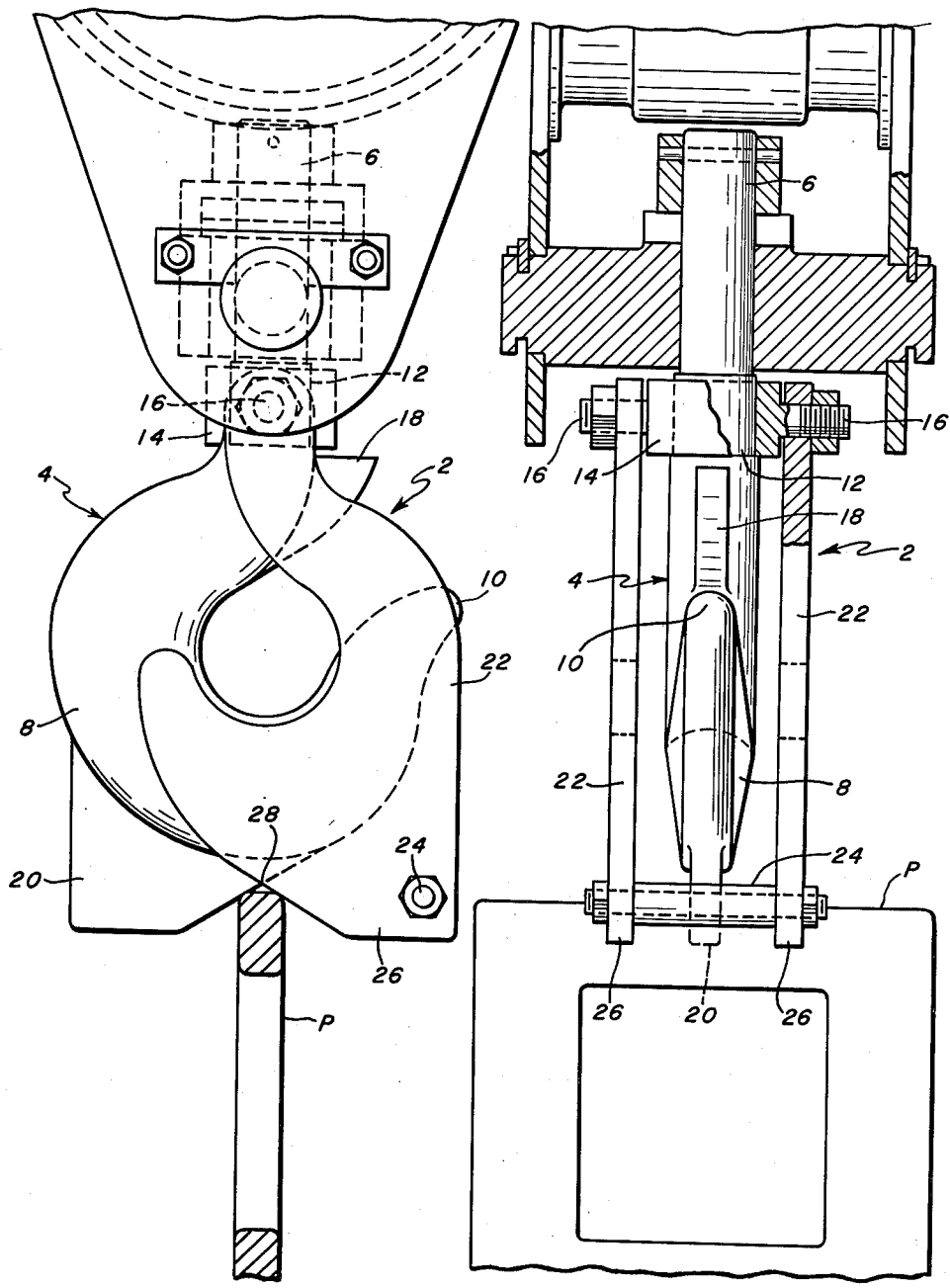
INVENTOR.
STEN P. LUNDSKOG
By Donald G. Dalton
Attorney Sept. 25, 1962  S. P. LUNDSKOG  3,055,697
LIFT HOOK WITH SELF-OPERATING SAFETY LATCH
Filed July 1, 1960  3 Sheets-Sheet 2

INVENTOR.
STEN P. LUNDSKOG
By Donald G. Dalton
Attorney

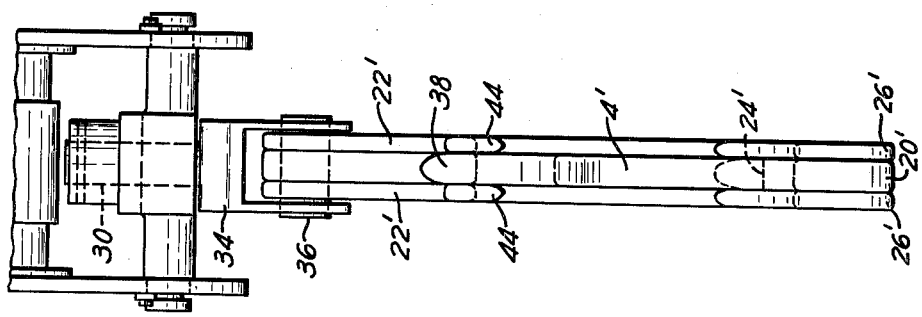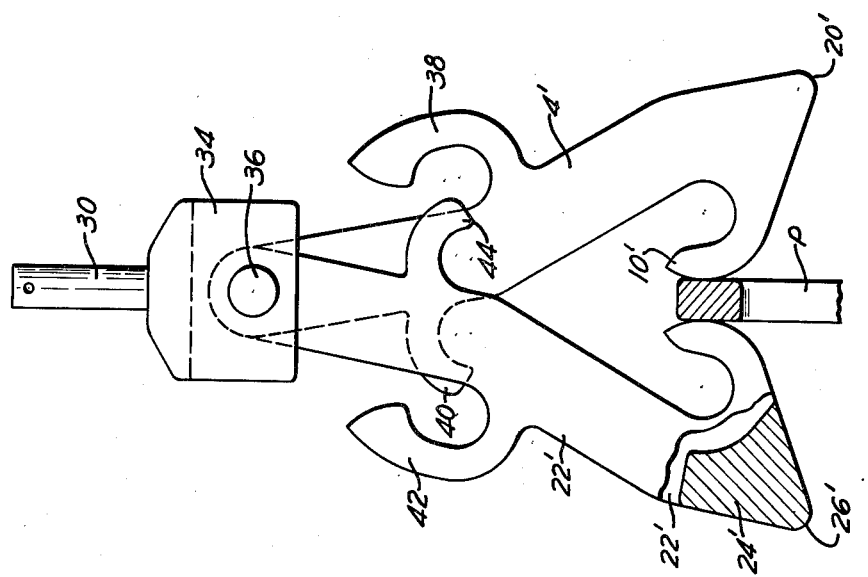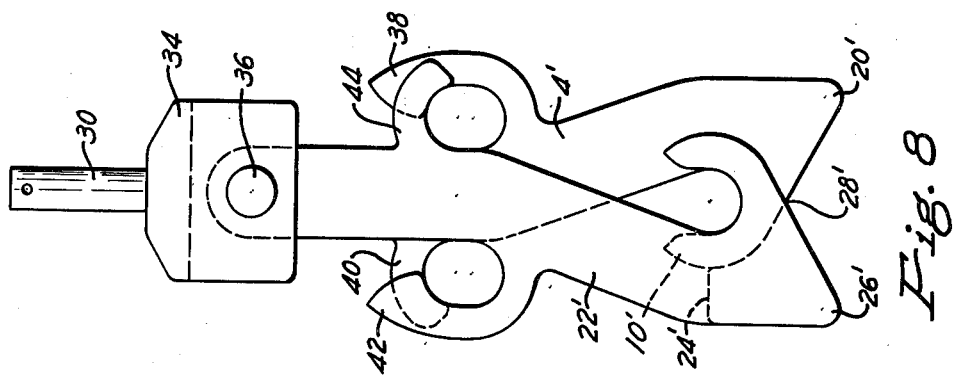

_United States Patent Office_

3,055,697
Patented Sept. 25, 1962

3,055,697
LIFT HOOK WITH SELF-OPERATING
SAFETY LATCH
Sten P. Lundskog, Lowell, Ind., assignor to United States
Steel Corporation, a corporation of New Jersey
Filed July 1, 1960, Ser. No. 40,251
1 Claim. (Cl. 294—83)

This application, which is a continuation-in-part of my co-pending application Serial No. 10,589, filed February 24, 1960, relates generally to lift hooks and more particularly has as its primary object to provide a self-operating lift hook and safety latch assembly.

Figure 3:
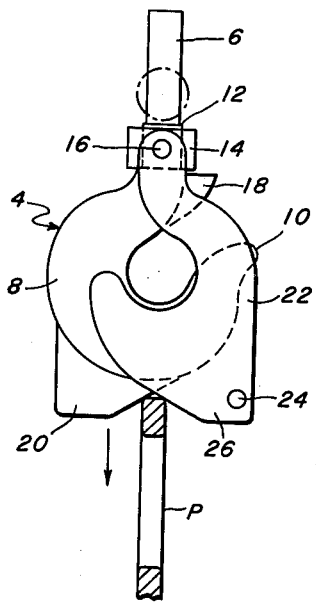
Figure 4:
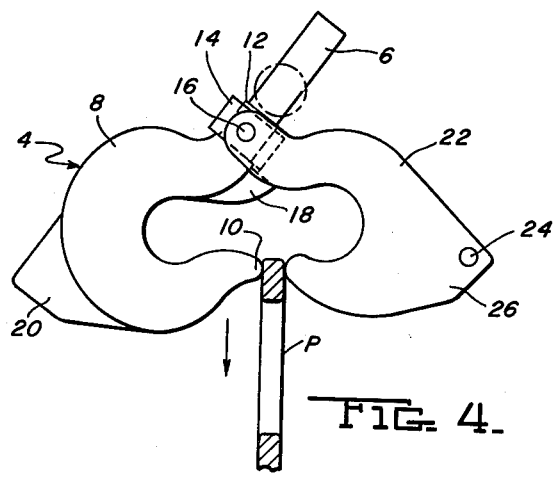
Figure 6:
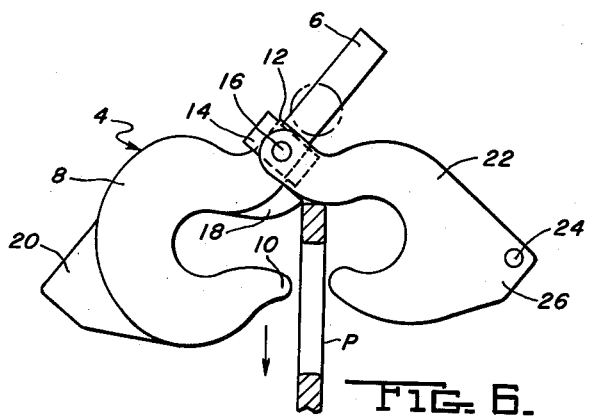
Figure 5:
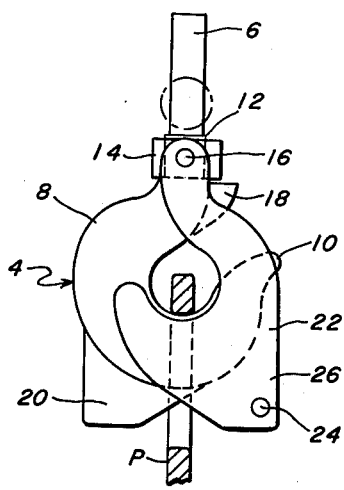
Figure 7:
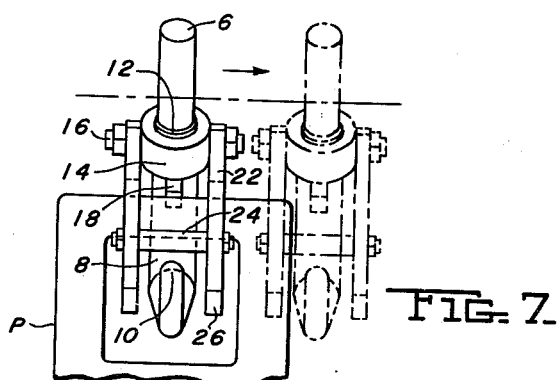

This and other objects will become more apparent after referring to the following specification and attached drawings, in which:

FIGURE 1 is a front elevational view;
FIGURE 2 is a side elevational view partly in section;
FIGURE 3 is a substantially diagrammatic view showing the lift hook of the invention in position preparatory to engaging a load in the form of a bail;
FIGURE 4 is a view similar to FIGURE 3 showing the hook in an advanced position preparatory to engaging the load;
FIGURE 5 is a view similar to FIGURE 3 showing the hook in lifting engagement with a load;
FIGURE 6 is a view similar to FIGURE 3 showing the hook being released from engagement with the load;
FIGURE 7 is an end view of FIGURE 6;
FIGURE 8 is a front elevational view similar to FIGURE 1 showing a modified embodiment of the invention;
FIGURE 9 is a view similar to FIGURE 8 showing the modified hook of the invention in advance position preparatory to engaging a load; and
FIGURE 10 is a side elevational view of the modified embodiment of the invention.

Referring more particularly to the drawings, reference numeral 2 designates generally the assembly of my invention which includes a lift hook 4 having a shank 6, load-supporting or saddle portion 8, and a bill 10. The shank 6 is formed with a shoulder 12 adjacent its lower end for seating a collar 14. Collar 14 is provided with trunnions 16 projecting from opposite sides thereof for a purpose which will become apparent. A projection 18 extends from the hook 4 immediately below the shoulder 12 and above the bill 10, as best shown in FIGURE 1. Projection 18 provides a cam surface which is used in the unlatching operation as will be explained more fully hereinafter. A projection 20 depends from the bottom of the saddle portion 8.

A pair of hook-shape plates 22 connected together in spaced relation at their lower ends by a shaft 24 is pivotally mounted on the trunnions 16 of the collar 14 in opposed relation to the lift hook straddling the bill 10. A projection 26 depends from the lower portions of each of the plates 22 which corresponds with the projection 20 on the bottom of the lift hook. The projection 20 and the projections 26 provide opposed cam surfaces which define a V notch 28 therebetween when the assembly is in normal closed position, as best shown in FIGURE 1.

In operation, to engage a lift plate P of a carrier bail (not shown) or other lift apparatus that presents an aperture or slot in which the hook may engage, the hook and latch assembly of the invention is lowered onto the top of the lift plate, and as the assembly is lowered it is centered on the edge of the lift plate by means of the projections 20 and 26 so that the lift plate edge enters the V notch 28, as shown in FIGURE 3. As the assembly is lowered further the lift hook and the latch formed by the pair of pivoted hook-shape plates spread apart in the position shown in FIGURE 4. Further lowering results in the hook and latch entering the aperture of the lift plate. After the aperture of the lift plate has thus been engaged, the hook and latch drop by gravity so that the hook is latched and ready to lift the lift plate, as best shown in FIGURE 5. The projections 20 and 26 provide the weight needed to insure that the hook and latch will assume and remain in closed position when suspended, as shown in FIGURES 3 and 5.

To disengage the hook after the lift plate and carrier have been lowered to the floor, the hook is lowered until the top edge of the lift plate strikes the throats of the hook and latch and then follows the cam surface provided by the projection 20 to spread the hook and latch to open position, as shown in FIGURE 6. The hook and latch assembly is then moved along the edge of the lift plate away from the aperture of the lift plate to the position shown by broken lines in FIGURE 7 so that the assembly can be raised free of the lift plate.

FIGURES 8, 9 and 10 illustrate a modified embodiment of my invention. Elements of the modified embodiment of the assembly of the invention which are similar in structure and function to elements of the preferred embodiment previously described have been designated by similar reference numerals but primed. This modified embodiment includes a shaft 30 which carries a clevis 34 swiveled to its lower end. A transverse pin or shaft 36 extend through the clevis 34, as best shown in FIGURE 10.

A pair of hook shaped plates 22′, connected together in spaced relation at their lower ends by a web 24′, is pivotally mounted on the shaft 36 in opposing relation to another hook shaped plate 4′ which is pivotally mounted on the shaft 36 between the plates 22′. In addition to joining plates 22′ together in spaced relation, web 24′ also functions as a stop to limit the distance the bill 10′ of the plate 4′ penetrates between the plates 22′ when the assembly assumes closed position as shown in FIGURE 8. The surface of the web 24′ which is engaged by the bill 10′ when the hook assembly is in closed position may be formed with a shape complementary to the bill.

A projection 20′ depends from the bottom of the plate 4′ and is similar to projections 26′ which depend from the bottom portion of each of the plates 22′. The projection 20′ and the projections 26′ provide opposed cam surfaces which define a V notch 28′ therebetween when the assembly is in normal closed position as shown in FIGURE 8.

Hook shaped plate 4′ is provided with an auxiliary hook or lift arm 38 projecting from one side thereof intermediate its length and a latch 40 projecting from its side opposite the auxiliary hook 38. Plates 22′ are similarly provided with auxiliary hooks or lift arms 42 on one side and latches 44 on the other. The auxiliary hooks 38 and 42 function to carry sling attachments, cables and the like for lifting loads. The latch elements 40 and 44 serve to lock loads carried by the auxiliary hooks 42 and 38, respectively, when the assembly is in closed position as shown in FIGURE 8.

Thus, the hook and latch assembly of the invention provides an arrangement whereby the hook is automatically closed when in lifting position so that a load cannot escape from the hook. Further, the unique structure of the hook and latch assembly renders it self-operable so that it is not necessary to employ a floorman for manipulating the hook to engage or disengage from a load. The hook and latch assembly of the invention can be manipulated to engage and disengage by the crane operator alone. The hook and latch assembly of the invention also provides auxiliary hooks in addition to the main hook, and latches for closing the auxiliary hooks.

While two embodiments of my invention have been shown and described it will be apparent that other adaptations and modifications may be made without departing from the scope of the following claim.

I claim:

In a self-operating lift hook and safety latch assembly comprising a lift hook having a shank, a load-support portion, and a bill; a hook shaped plate having a shank, a load-support portion, and a bill; said hook shaped plate being pivoted at its end remote from its bill to the end of the lift hook shank remote from its bill in opposed relation to said lift hook with the bills and load-support portions of said plate and said hook normally in overlapping relation, and opposed cam surfaces on the lower portions of said lift hook and plate normally defining a V notch therebetween, the improvement therewith of an auxiliary generally laterally and outwardly extending lift arm formed on the shank of one of said lift hook or plate, and a generally laterally and outwardly extending latch projection formed on the shank of the other one of said lift hook or plate, said latch projection normally overlapping and closing said lift arm when the bills and load-support portions of said plate and said lift hook are in overlapping relation.

References Cited in the file of this patent

UNITED STATES PATENTS

| | | |
|---|---|---|
| 1,860,121 | Trout | May 24, 1932 |
| 2,426,099 | Hershowitz | Aug. 19, 1947 |
| 2,476,734 | Jellison | July 19, 1949 |
| 2,958,557 | Cianchette | Nov. 1, 1960 |